(No Model.)
D. LEAKE.
NUT LOCK.
No. 365,828. Patented July 5, 1887.
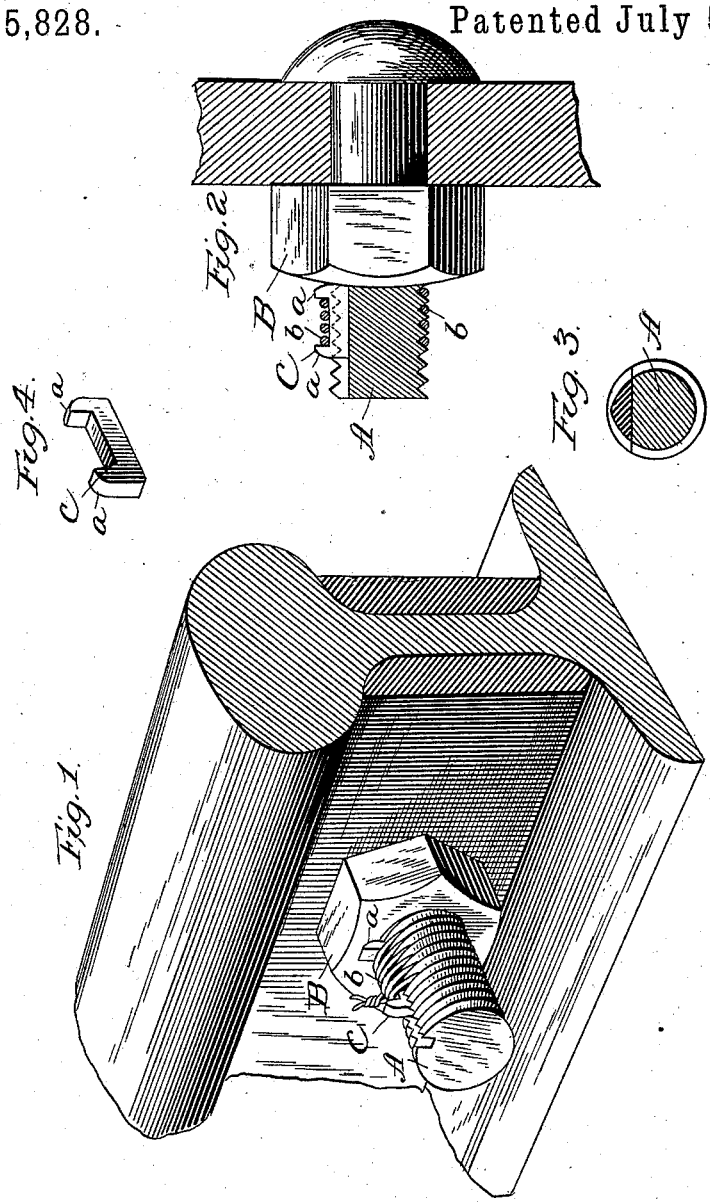

UNITED STATES PATENT OFFICE.

DOUGLAS LEAKE, OF PHILADELPHIA, PENNSYLVANIA.

NUT-LOCK.

SPECIFICATION forming part of Letters Patent No. 365,828, dated July 5, 1887.

Application filed October 7, 1886. Serial No. 215,570. (No model.)

*To all whom it may concern:*

Be it known that I, DOUGLAS LEAKE, of Philadelphia, in the county of Philadelphia and State of Pennsylvania, have invented a new and useful Improvement in Nut-Locks; and I do hereby declare that the following is a full, clear, and exact description of the same.

My invention relates to nut-locks; and its object is to provide a lock for use with the ordinary threaded bolt to hold the nut securely in position, and also to provide a lock which may be easily removed and as easily replaced.

The invention consists, in connection with the threaded bolt and the ordinary nut adapted thereto, of a key fitted to the slot in the bolt or reduced portion thereof, and a retaining-wire adapted to be wound around the key and the threads of the bolt, whereby the nut is securely locked in position and prevented from being jarred off.

My invention also consists in making the periphery of the key to extend on a line with or above the apex of the threads of the bolt, whereby when the wire is wrapped around the same it passes out of the circular line of the circumference of the bolt, and slipping is thus prevented.

In the drawings, Figure 1 represents a section through the bolt and nut, with the locking device shown in side elevation. Fig. 2 is a cross-section of the bolt and locking device. Fig. 3 represents a modification. Fig. 4 is a view of the key detached.

In many situations where ordinary threaded nuts are used—such as fastening rails together in the construction of railways—the constant passage of the train causes the bolt to vibrate, and these vibrations soon loosen the nut and it gradually traverses the threaded bolt and finally drops off. It is necessary, therefore, that some fastening device be provided to bear against the nut to keep it in the proper position to hold the rails or other parts in place against the vibrations communicated by the passing trains. Numerous devices have heretofore been suggested for this purpose; but they are more or less objectionable by reason of their complex construction and the cost attending their manufacture.

It is desirable that the fastening device be exceedingly simple and cheap to make, and also that it be capable of easy removal and replacing without special tools and by ordinary workmen; and these objects I have sought to attain in my invention. As shown in Fig. 1, the bolt A is of ordinary construction, and is screw-threaded the greater part of its length. An ordinary nut, B, is adapted to the bolt and in practice is screwed up snugly against the part which it is to assist in holding in position. The bolt is slotted a suitable portion of its length, and in this slot I place a key, C, which is forced along the slot until its forward upturned end bears against the surface of the nut. The key is provided with upturned ends $a\ a$ both in front and rear, as shown. The diameter of the key is in excess of the depth of the slot for the purpose hereinafter described. After the key has been forced against the end of the nut, I take a section of ordinary wire (shown at $b$) and wrap it around the bolt and the key between its upturned ends, the wire fitting in the threads of the bolt, as shown. The ends of the key prevent the wire from slipping, and the vibrations of the nut and bolt cannot have any effect upon the key to move it along toward the end of the bolt. In order, however, to guard against any possibility of the wire slipping or being turned by the vibrations imparted to the bolt and nut, I have provided, as stated above, the key of a greater thickness than the depth of the slot, so that its upper surface comes upon a line with or above the apex of the threads, and the wire loops passing around the bolt and the key do not assume a perfect circle, but are slightly distorted, thus removing all possibility of the slipping of the wire around the bolt and key.

Instead of forming the longitudinal slot of the shape shown, it may be made in any shape, or a section of the periphery may be cut off, as shown in Fig. 3, and a key of corresponding shape, but a little larger, may be used instead of the key shown; but I do not limit myself in this connection.

I am aware that it has been suggested to hold a nut in place by wrapping wires around the threads of the bolt behind the nut and securing the ends of the wires from slipping by passing them through a slit in one of the threads, and I do not broadly claim this as my invention.

I claim as my invention—

1. A nut-lock consisting of a key and bolt provided with a groove in its periphery to receive the same, said key bearing against the nut having upturned ends, and a wire adapted to pass around the bolt and key between the upturned ends of said key, substantially as described.

2. The combination, with a grooved bolt and a nut adapted thereto, of a key adapted to lock the nut in place, the surface of said key being above the bottom of the grooves of the bolt, and a wire fastening adapted to pass around the bolt and key, substantially as described.

In testimony whereof I have signed my name to this specification in the presence of two subscribing witnesses.

DOUGLAS LEAKE.

Witnesses:
ALBERT W. COX,
CHARLES CARVER.